United States Patent
Yan

(10) Patent No.: US 12,493,924 B2
(45) Date of Patent: Dec. 9, 2025

(54) IMAGE PROCESSING ASSEMBLY, CHIP, IMAGE PROCESSING METHOD AND STORAGE MEDIUM

(71) Applicant: AXERA TECHNOLOGY (BEIJING) CO., LTD., Beijing (CN)

(72) Inventor: Han Yan, Beijing (CN)

(73) Assignee: AXERA TECHNOLOGY (BEIJING) CO., LTD., Beijing (CN)

( * ) Notice: Subject to any disclaimer, the term of this patent is extended or adjusted under 35 U.S.C. 154(b) by 391 days.

(21) Appl. No.: 18/042,885

(22) PCT Filed: Dec. 7, 2021

(86) PCT No.: PCT/CN2021/135898
§ 371 (c)(1),
(2) Date: Feb. 24, 2023

(87) PCT Pub. No.: WO2022/267361
PCT Pub. Date: Dec. 29, 2022

(65) Prior Publication Data
US 2023/0306555 A1    Sep. 28, 2023

(30) Foreign Application Priority Data
Jun. 25, 2021 (CN) .......................... 202110715670.1

(51) Int. Cl.
G06T 3/4007 (2024.01)
G06T 1/60 (2006.01)
G06T 3/02 (2024.01)

(52) U.S. Cl.
CPC .............. G06T 3/4007 (2013.01); G06T 1/60 (2013.01); G06T 3/02 (2024.01)

(58) Field of Classification Search
None
See application file for complete search history.

(56) References Cited

U.S. PATENT DOCUMENTS 7,450,270 B2 * 11/2008 He .................. H04N 1/40037
                                                       382/237
8,903,191 B2 * 12/2014 Nestares .................. G06T 5/50
                                                       382/284

(Continued)

FOREIGN PATENT DOCUMENTS

CN    104021549 A    9/2014
CN    104361555 A    2/2015

(Continued)

OTHER PUBLICATIONS

International Search Report dated Mar. 23, 2022, pertaining to Int'l Patent Application No. PCT/CN2021/135898, 10 pgs.

*Primary Examiner* — Helen Zong
(74) *Attorney, Agent, or Firm* — DINSMORE & SHOHL LLP

(57) ABSTRACT

Provided are image processing assembly, chip, image processing method and storage medium. Image processing assembly includes address generation unit, source image reading unit and interpolation calculation unit, address generation unit is connected to source image reading unit, which is connected to interpolation calculation unit; address generation unit calculates source point coordinates of target pixel point in source image according to coordinates of target pixel point, determines, according to source point coordinates, multiple neighborhood integer coordinates corresponding to source point coordinates, and determines reading address of each neighborhood integer coordinate in memory according to multiple neighborhood integer coordinates; source image reading unit obtains, according to read address of each neighborhood integer coordinate in memory, pixel value corresponding to each neighborhood integer coordinate; and interpolation calculation unit performs interpolation calculation according to pixel value, to obtain pixel (Continued)

value of target pixel point in affine image which corresponds to source image.

12 Claims, 5 Drawing Sheets

(56) References Cited

U.S. PATENT DOCUMENTS

2006/0239571 A1* 10/2006 Dong ............... G06T 7/238
　　　　　　　　　　　　　　　　　　　382/236
2020/0213620 A1* 7/2020 Zhao ............... H04N 13/156

FOREIGN PATENT DOCUMENTS

| CN | 110503602 A | 11/2019 |
| CN | 113298695 A | 8/2021 |

* cited by examiner

IMAGE PROCESSING ASSEMBLY, CHIP, IMAGE PROCESSING METHOD AND STORAGE MEDIUM

CROSS REFERENCE TO RELATED APPLICATIONS

The present application is a National Phase Entry of International Patent Application No. PCT/CN2021/135898 filed Dec. 7, 2021, which claims priority to Chinese Patent Application No. 202110715670.1 filed to China National Intellectual Property Administration on Jun. 25, 2021, and entitled "IMAGE PROCESSING ASSEMBLY, CHIP, IMAGE PROCESSING METHOD AND STORAGE MEDIUM", which are hereby incorporated by reference in their entirety.

TECHNICAL FIELD

The present application relates to the technical field of image processing, and in particular to an image processing component (i.e., an image processing assembly) and a chip, an image processing method, and a storage medium.

BACKGROUND

At present, an affine transformation function, namely a warp function, is often applied to algorithm development in the conventional vision field or the AI vision field, and when the function is applied, a software method is generally adopted for implementation at present; however, the affine transformation function implemented by adopting the software method occupies more CPU resources, resulting in excessive CPU load.

SUMMARY

Embodiments of the present application provide an image processing component and a chip, an image processing method, and a storage medium, thereby solving at least the above-mentioned problems in the related art.

In some implementations, the present application provides an image processing component, which may comprise an address generation unit, a source image reading unit and an interpolation calculation unit, wherein the address generation unit may be connected with the source image reading unit, and the source image reading unit may be connected with the interpolation calculation unit; the address generation unit may be configured to calculate a source point coordinate of a target pixel point in a source image according to a coordinate of the target pixel point, determine a plurality of neighborhood integer coordinates corresponding to the source point coordinate according to the source point coordinate, determine a reading address of each neighborhood integer coordinate in a memory according to the plurality of neighborhood integer coordinates corresponding to the source point coordinate, and send the reading addresses of the neighborhood integer coordinates in the memory to the source image reading unit; the source image reading unit may be configured to read and obtain a pixel value corresponding to each neighborhood integer coordinate according to the reading address of each neighborhood integer coordinate in the memory, and send the pixel value corresponding to each neighborhood integer coordinate to the interpolation calculation unit; the interpolation calculation unit may be configured to perform interpolation calculation according to the pixel value corresponding to each neighborhood integer coordinate to obtain a pixel value of the target pixel point in an affine image corresponding to the source image.

In the image processing component designed above, through the cooperation of the entity hardware address generation unit, the source image reading unit and the interpolation calculation unit, the pixel value of the target pixel point in the affine image corresponding to the source image can be obtained through calculation and inquiry based on the coordinate of the target pixel point, so as to realize the affine transformation of the target pixel point, and in such a way, after the address generation unit receives each target pixel point in the affine area, the pixel value corresponding to each target pixel point in the affine area can be obtained, and then, an affine image corresponding to the affine area can be obtained; therefore, it can be seen that the warp calculation is completed in a pure hardware mode by the present application, so that the warp is not required to be executed by CPU software, and the resource occupancy rate of the CPU is reduced.

In an optional implementation, the image processing component may further comprise a writing unit connected with the address generation unit and the interpolation calculation unit, respectively, and the address generation unit may be further configured to generate a writing address of the target pixel point in the memory according to the coordinate of the target pixel point and send the writing address to the writing unit, wherein the writing unit may be configured to write the pixel value of the target pixel point in the affine image corresponding to the source image into the writing address corresponding to the target pixel point.

In an optional implementation, the source image reading unit may comprise a plurality of reading threads, and the source image reading unit may be configured to read a plurality of pixel values corresponding to the plurality of neighborhood integer coordinates using the plurality of reading threads, wherein each reading thread reads a pixel value corresponding to one neighborhood integer coordinate correspondingly.

In the implementation designed above, pixel values corresponding to a plurality of neighborhood integer coordinates may be read simultaneously through a plurality of reading threads, so as to accelerate the reading processing speed of the image processing component.

In an optional implementation, the image processing component may further comprise a cache unit, wherein the cache unit may be arranged between the source image reading unit and the interpolation calculation unit, and the cache unit may be configured to store the pixel value corresponding to the neighborhood integer coordinate read by the source image reading unit.

In an optional implementation, the address generation unit is further connected with the cache unit, and the address generation unit may be further configured to determine whether at least one neighborhood integer coordinate of the plurality of neighborhood integer coordinates exists in the cache unit, if so, send a pixel value corresponding to the neighborhood integer coordinate in the cache unit to the interpolation calculation unit, and send a reading address corresponding to the neighborhood integer coordinate that does not exist in the cache unit to the source image reading unit, and otherwise, perform the step of determining a reading address of the neighborhood integer coordinate in a memory according to the plurality of neighborhood integer coordinates corresponding to the source point coordinate and sending the reading address of the neighborhood integer coordinate in the memory to the source image reading unit.

In the implementation designed above, the pixel value corresponding to the neighborhood integer coordinate is cached by the cache unit, so that when the neighborhood integer coordinates corresponding to a plurality of the target pixel points processed by the image processing component are repeated, the neighborhood integer coordinates can be directly read from the cache unit, thereby saving the time for generating the reading address and reading from the memory and accelerating the processing speed of the image processing component.

In other implementations, the present application provides an image processing method applied to the image processing component according to any one of the aforementioned implementations, which may comprise: calculating a source point coordinate of a target pixel point in a source image according to a coordinate of the target pixel point; determining a plurality of neighborhood integer coordinates corresponding to the source point coordinate according to the source point coordinate; determining a reading address of each neighborhood integer coordinate in a memory according to the plurality of neighborhood integer coordinates corresponding to the source point coordinate; reading and obtaining a pixel value corresponding to each neighborhood integer coordinate according to the reading address of each neighborhood integer coordinate in the memory; and performing interpolation calculation according to the pixel value corresponding to each neighborhood integer coordinate to obtain a pixel value of the target pixel point in an affine image corresponding to the source image.

In the image processing method designed above, the entity image processing component calculates and queries the pixel value of the target pixel point in the affine image corresponding to the source image based on the coordinate of the target pixel point so as to realize the affine transformation of the target pixel point, and in such a way, after the address generation unit receives each target pixel point in the affine area, the pixel value corresponding to each target pixel point in the affine area can be obtained, and then, an affine image corresponding to the affine area can be obtained; therefore, it can be seen that the warp calculation is completed in a pure hardware mode by the present application, so that the warp is not required to be executed by CPU software, and the resource occupancy rate of the CPU is reduced.

In an optional implementation, before the calculating a source point coordinate of a target pixel point in a source image according to a coordinate of the target pixel point, the image processing method may further comprise: acquiring a target area in an affine image corresponding to the source image, wherein the target area is obtained through affine transformation of a polygonal area in the source image; and sequentially reading a coordinate of each pixel point in the target area to obtain a coordinate of each target pixel point.

In an optional implementation, after the performing interpolation calculation according to the pixel value corresponding to each neighborhood integer coordinate to obtain a pixel value of the target pixel point in an affine image corresponding to the source image, the image processing method may further comprise: generating a corresponding writing address of the target pixel point according to the coordinate of the target pixel point; and writing the pixel value of the target pixel point in the affine image corresponding to the source image into the writing address corresponding to the target pixel point.

In yet other implementations, the present application provides an image processing apparatus, which comprises a calculation module that may be configured to calculate a source point coordinate of a target pixel point in a source image according to a coordinate of the target pixel point; a determination module that may be configured to determine a plurality of neighborhood integer coordinates corresponding to the source point coordinate according to the source point coordinate, and determine a reading address of each neighborhood integer coordinate in a memory according to the plurality of neighborhood integer coordinates corresponding to the source point coordinate; a reading module that may be configured to read and obtain a pixel value corresponding to each neighborhood integer coordinate according to the reading address of each neighborhood integer coordinate in the memory; and an interpolation calculation module that may be configured to perform interpolation calculation according to the pixel value corresponding to each neighborhood integer coordinate to obtain a pixel value of the target pixel point in an affine image corresponding to the source image.

In the above image processing apparatus, the entity image processing component calculates and queries the pixel value of the target pixel point in the affine image corresponding to the source image based on the coordinate of the target pixel point so as to realize the affine transformation of the target pixel point, and in such a way, after the address generation unit receives each target pixel point in the affine area, the pixel value corresponding to each target pixel point in the affine area can be obtained, and then, an affine image corresponding to the affine area can be obtained; therefore, it can be seen that the warp calculation is completed in a pure hardware mode by the present application, so that the warp is not required to be executed by CPU software, and the resource occupancy rate of the CPU is reduced.

In an optional implementation, the apparatus may further comprise an acquisition module that may be configured to acquire a target area in an affine image corresponding to the source image, wherein the target area is obtained through affine transformation of a polygonal area in the source image; the reading module may be further configured to sequentially read a coordinate of each pixel point in the target area to obtain a coordinate of each target pixel point.

In an optional implementation, the apparatus may further comprise: a generation module that may be configured to generate a corresponding writing address of the target pixel point according to the coordinate of the target pixel point; and a writing module that may be configured to write the pixel value of the target pixel point in the affine image corresponding to the source image into the writing address corresponding to the target pixel point.

In still other implementations, the present application provides a chip, wherein the chip may comprise the image processing component provided in any optional implementation of the aforementioned implementations.

In further other implementations, the present application provides an electronic device, which may comprise a memory having a computer program stored thereon and a processor, wherein the computer program, when executed by the processor, may implement the image processing method provided in any one of the aforementioned implementations.

In still yet other implementations, the present application provides a storage medium having a computer program stored thereon, wherein the computer program, when executed by a processor, may implement the image processing method provided in any one of the aforementioned implementations.

In still further other implementations, the present application provides a computer program product, wherein the computer program product, when operated on a computer, causes the computer to implement the image processing method provided in any one of the aforementioned implementations.

BRIEF DESCRIPTION OF THE DRAWINGS

In order to more clearly illustrate the technical schemes of the embodiments of the present application, the drawings required in the embodiments of the present application will be briefly described below. It should be understood that the following drawings only illustrate some embodiments of the present application and therefore should not be considered as limitations of the scope, and for those of ordinary skill in the art, other related drawings can be obtained according to these drawings without creative efforts.

Reference numbers: 1 represents an image processing component; 4 represents a chip; 10 represents an address generation unit; 20 represents a source image reading unit; 201 represents a reading thread; 30 represents an interpolation calculation unit; 40 represents a writing unit; 50 represents a cache unit; 100 represents a calculation module; 110 represents a determination module; 120 represents a reading module; 130 represents an interpolation calculation module; 140 represents an acquisition module; 150 represents a generation module; 160 represents a writing module; 11 represents an electronic device; 1101 represents a processor; 1102 represents a memory; 1103 represents a communication bus.

DETAILED DESCRIPTION OF EMBODIMENTS

The technical schemes in embodiments of the present application will be described below with reference to the drawings in the embodiments of the present application.

Figure 1:
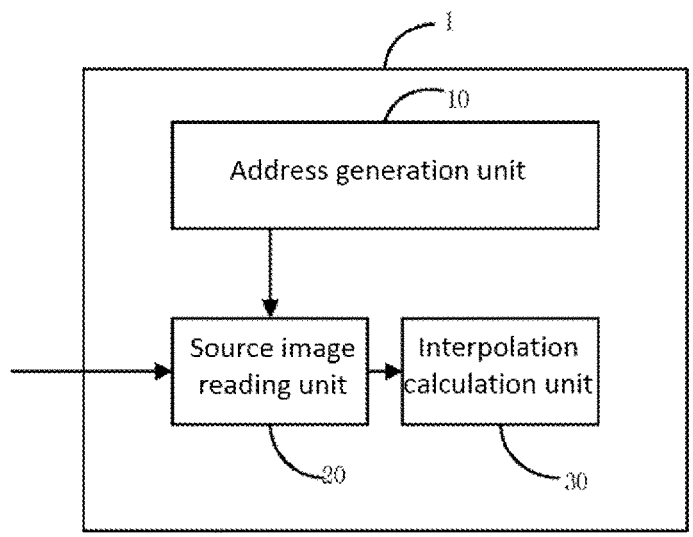
FIG. 1 is a schematic diagram of a first structure of an image processing component provided in an embodiment of the present application.

The embodiment of the present application provides an image processing component, which completes warp calculation in a pure hardware manner, so that warp is not required to be executed by CPU software, and the resource occupancy rate of the CPU is reduced; as shown in FIG. 1, the image processing component 1 comprises an address generation unit 10, a source image reading unit 20 and an interpolation calculation unit 30, wherein the address generation unit 10 is connected with the source image reading unit 20, and the source image reading unit 20 is connected with the interpolation calculation unit 30.

Figure 2:
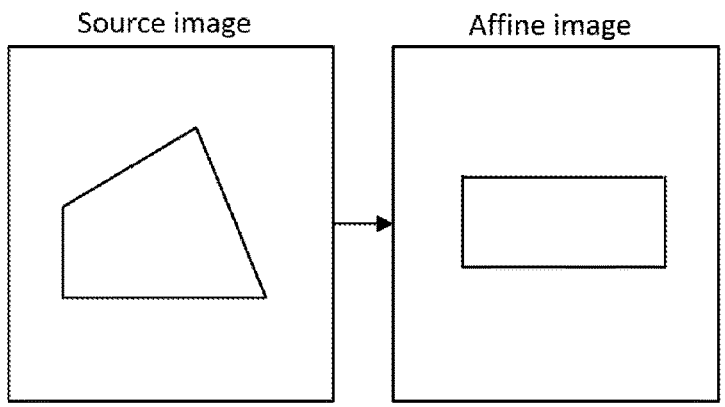
FIG. 2 is an exemplary diagram of a source image and an affine image provided in an embodiment of the present application.

In the image processing component with the above structure, the address generation unit 10 may receive a coordinate of a target pixel point sent from the outside, and calculate a source point coordinate of the target pixel point in a source image according to the coordinate of the target pixel point; and then determine a plurality of neighborhood integer coordinates corresponding to the source point coordinate according to the source point coordinate, determine a reading address of each neighborhood integer coordinate in a memory according to the plurality of neighborhood integer coordinates corresponding to the source point coordinate, and send the reading addresses to the source image reading unit 20. The target pixel point may be any pixel point in the affine image after affine transformation of the source image. As shown in FIG. 2, the source image is an image with an irregular quadrilateral on the left side of FIG. 2, the affine image is an image with a regular rectangle on the right side, and the image with an irregular quadrilateral may be converted into the image with a regular rectangle on the right side through affine transformation, where each point in the irregular quadrilateral area may be referred to as a source point. The regular rectangular area may be a target area, and each point in the target area may be a target pixel point. The target pixel point in this scheme may be any point in the affine image, the address generation unit 10 may sequentially read each target pixel point in the affine image and then sequentially perform processing, and the method for calculating a corresponding source point coordinate according to the coordinate of the target pixel point may use an existing warp conversion calculation formula, for example, the following conversion calculation formula is used:

$$dst(x, y) = src\left(\frac{M_{11}x + M_{12}y + M_{13}}{M_{31}x + M_{32}x + M_{33}}, \frac{M_{21}x + M_{22}x + M_{23}}{M_{31}x + M_{32}x + M_{33}}\right);$$

wherein dst(x, y) represents a coordinate of the target pixel point, and $$src\left(\frac{M_{11}x + M_{12}y + M_{13}}{M_{31}x + M_{32}x + M_{33}}, \frac{M_{21}x + M_{22}x + M_{23}}{M_{31}x + M_{32}x + M_{33}}\right)$$

represents the source point coordinate, wherein $M_{11}$, $M_{12}$, $M_{13}$, $M_{21}$, $M_{22}$, $M_{23}$, $M_{31}$, $M_{32}$, and $M_{33}$ are all constants. The neighborhood integer coordinate corresponding to the source point coordinate may be obtained by rounding up and rounding down each coordinate value of the source point coordinate, for example, the source point coordinate is (1.5, 2.5), and then a plurality of neighborhood certificate coordinates corresponding to the source point coordinate are (1, 2), (2, 2), (1, 3), and (2, 3).

The source image reading unit 20 reads a pixel value corresponding to each neighborhood integer coordinate in a memory according to the reading address of each neighborhood integer coordinate sent by the address generation unit 10, wherein the memory has a plurality of reading addresses, each reading address stores a pixel value correspondingly, and each reading address is generated by calculation according to a coordinate value of one neighborhood integer coordinate. After the source image reading unit 20 reads the pixel value corresponding to each neighborhood integer coordinate, the read data is transmitted to the interpolation calculation unit 30.

The interpolation calculation unit 30 performs interpolation calculation according to the pixel values corresponding to the plurality of neighborhood integer coordinates, and then obtains the pixel value of the target pixel point in the affine image corresponding to the source image.

The image processing component designed above, through the cooperation of the entity hardware address generation unit, the source image reading unit and the interpolation calculation unit, can calculate and query the pixel value of the target pixel point in the affine image corresponding to the source image based on the coordinate of the target pixel point so as to realize the affine transformation of the target pixel point, so as to realize affine transformation of the target pixel point, and in such a way, after the address generation unit receives each target pixel point in the affine area, the pixel value corresponding to each target pixel point in the affine area can be obtained, and then, an affine image corresponding to the affine area can be obtained; therefore, it can be seen that the warp calculation is completed in a pure hardware mode by the present application, so that the warp is not required to be executed by CPU software, and the resource occupancy rate of the CPU is reduced.

Figure 3:
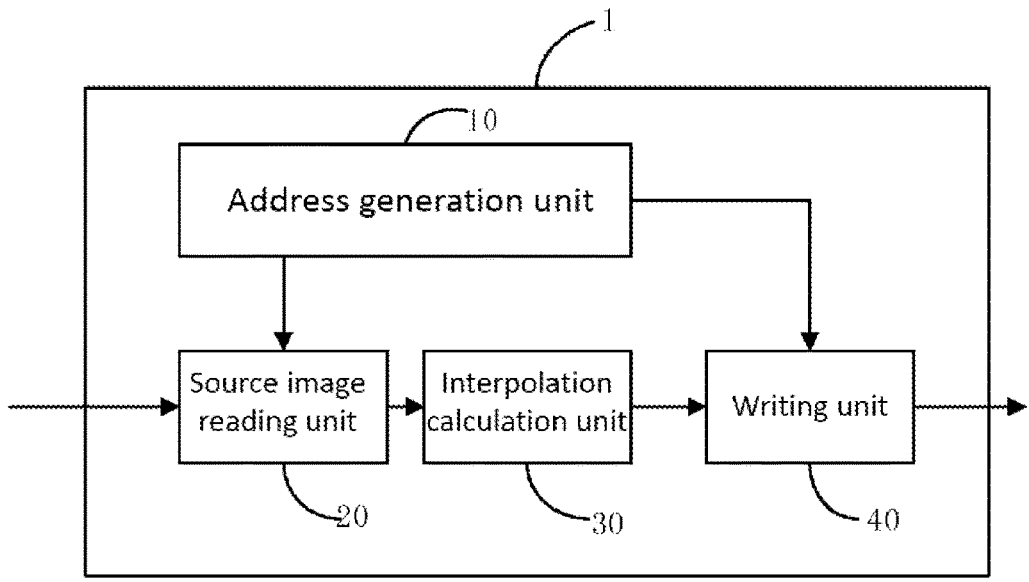
FIG. 3 is a schematic diagram of a second structure of an image processing component provided in an embodiment of the present application.

In an optional implementation of this embodiment, as shown in FIG. 3, the image processing component 1 further comprises a writing unit 40, wherein the writing unit 40 is connected with the address generation unit 10 and the interpolation calculation unit 30, the address generation unit 10 may be further configured to generate a writing address of the target pixel point in the memory according to the coordinate of the target pixel point, where the writing address may be generated by calculation according to the coordinate value of the target pixel point, and the writing addresses corresponding to the target pixel points with different coordinate values are different. The address generation unit 10 generates a writing address of the target pixel point in the memory, and then sends the writing address to the writing unit 40, and after obtaining a pixel value corresponding to the target pixel point calculated by the interpolation calculation unit 30, the writing unit 40 writes the pixel value corresponding to the target pixel point in the writing address corresponding to the memory.

Figure 4:
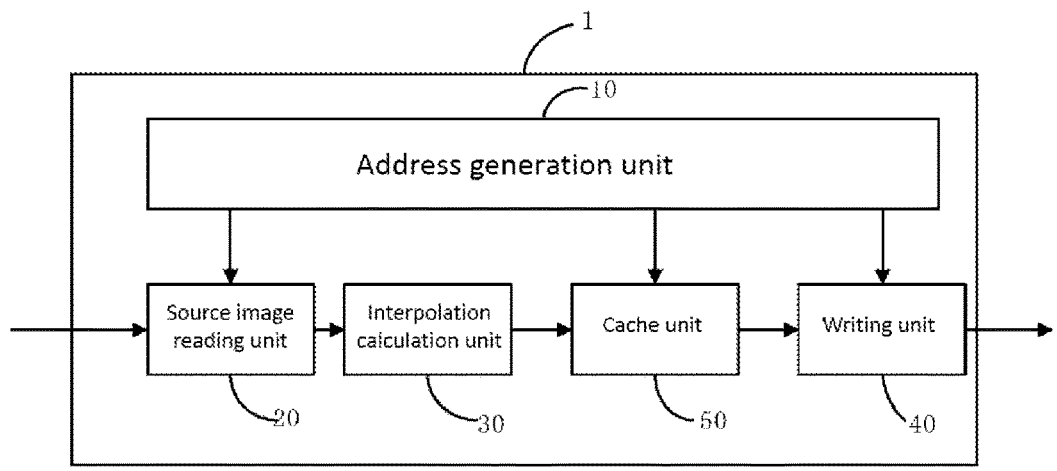
FIG. 4 is a schematic diagram of a third structure of an image processing component provided in an embodiment of the present application.

In an optional implementation of this embodiment, as shown in FIG. 4, the image processing component 1 further comprises a cache unit 50, the source image reading unit 20 is connected with the interpolation calculation unit 30 through the cache unit 50, and the cache unit 50 may be configured to store the pixel value corresponding to the neighborhood integer coordinate read by the source image reading unit 20. As a possible implementation, the pixel value corresponding to the neighborhood integer coordinate stored by the cache unit 50 may be updated in real time, for example, the last stored pixel value may be deleted after receiving one pixel value or a batch of pixel values transmitted by the source image reading unit 20.

In an optional implementation of this embodiment, when the image processing component processes a plurality of target pixel points, neighborhood integer coordinates corresponding to the source point coordinate corresponding to the plurality of the target pixel points may be repeated. In such a scenario, this scheme may save reading time and improve processing speed by adopting the following: the cache unit 50 may further be connected with the address generation unit 10, and after obtaining the plurality of neighborhood integer coordinates corresponding to the source point coordinate, the address generation unit 10 may determine whether any neighborhood integer coordinate in the plurality of neighborhood integer coordinates exists in the cache unit, and if so, the pixel value of the neighborhood integer coordinate existing in the cache unit does not need to be read, and may be directly transmitted to the interpolation calculation unit 30 through the cache unit 50; the neighborhood integer coordinate that does not exist in the cache unit 50 generates a corresponding read address, and the source image reading unit 20 reads and obtains the corresponding pixel value from the memory.

Figure 5:
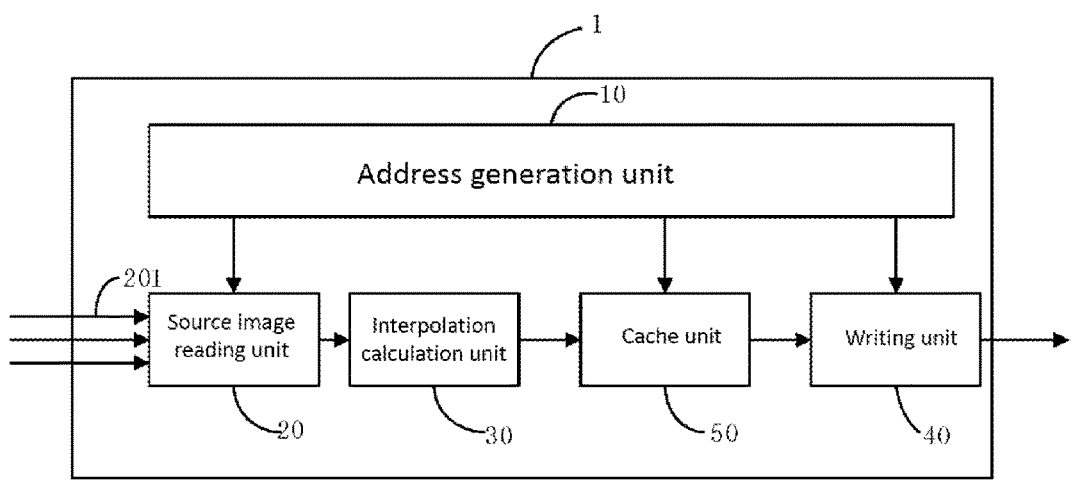
FIG. 5 is a schematic diagram of a fourth structure of an image processing component provided in an embodiment of the present application.

In an optional implementation of this embodiment, as shown in FIG. 5, the source image reading unit 20 may comprise a plurality of reading threads 201, and after obtaining the reading address corresponding to each neighborhood integer coordinate sent by the address generation unit 10, the source image reading unit 20 may read the plurality of reading addresses through the plurality of reading threads 201, and then obtain a plurality of pixel values corresponding to a plurality of neighborhood integer coordinates. For example, when the number of the neighborhood integer coordinates is 4, the number of the corresponding read addresses is 4, there may be 4 reading threads in the source image reading unit 20, and each reading thread reads the corresponding pixel value based on a reading address to obtain the pixel values corresponding to 4 neighborhood integer coordinates, so that the reading speed of the source image reading unit 20 may be increased by such a plurality of reading threads.

Figure 6:
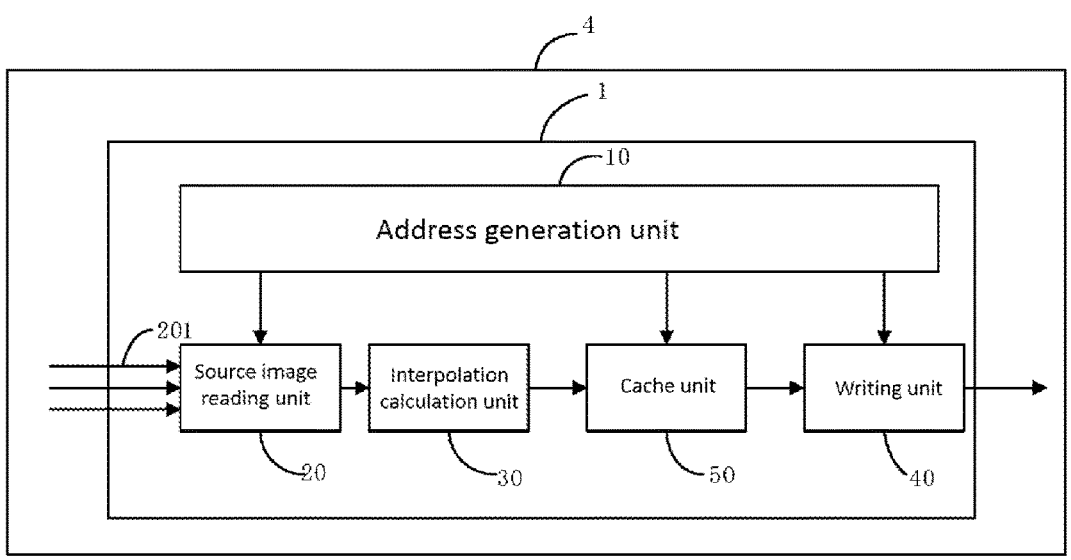
FIG. 6 is a schematic diagram of the structure of a chip provided in an embodiment of the present application.

In an optional implementation of this embodiment, as shown in FIG. 6, the image processing component 1 according to any one of the aforementioned implementations may be provided in a chip 4.

Figure 7:
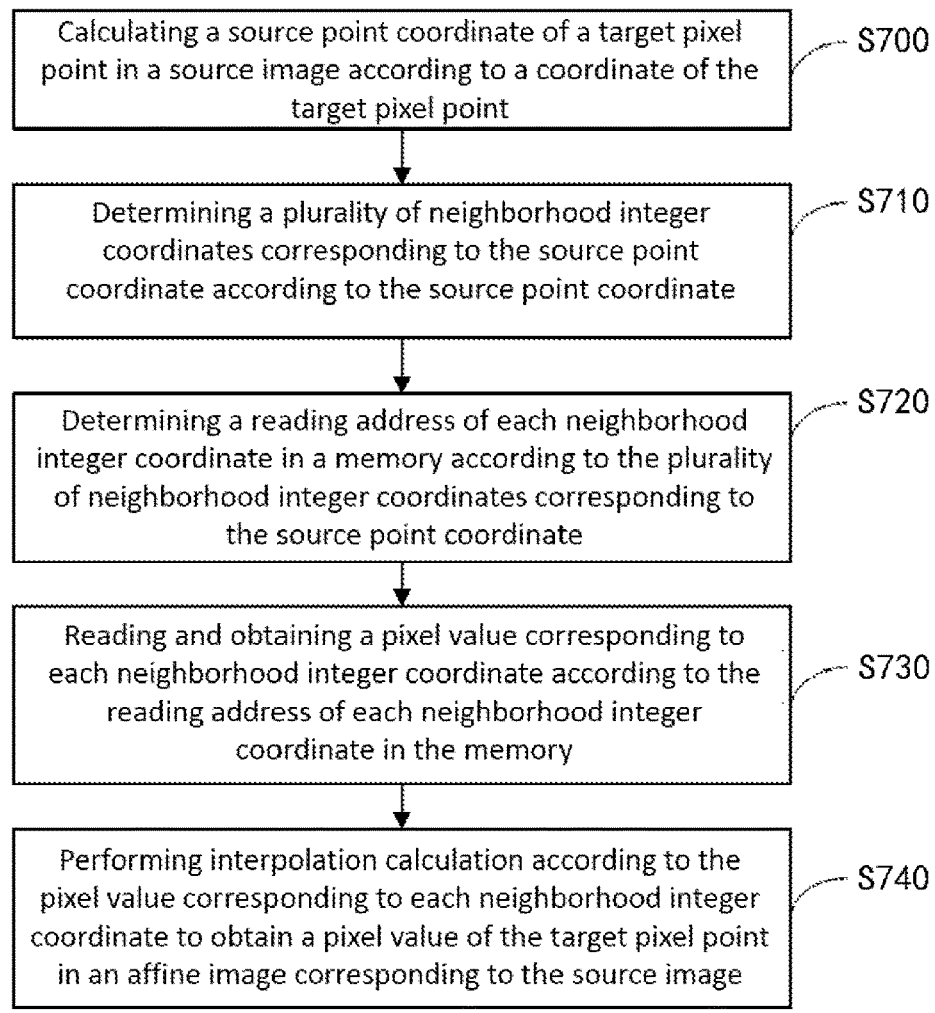
FIG. 7 is a first flowchart of an image processing method provided in an embodiment of the present application.

The present application provides an image processing method, which is applied to the aforementioned image processing component, as shown in FIG. 7, the method comprises the following steps:

step S700: calculating a source point coordinate of a target pixel point in a source image according to a coordinate of the target pixel point;

step S710: determining a plurality of neighborhood integer coordinates corresponding to the source point coordinate according to the source point coordinate;

step S720: determining a reading address of each neighborhood integer coordinate in a memory according to the plurality of neighborhood integer coordinates corresponding to the source point coordinate;

step S730: reading and obtaining a pixel value corresponding to each neighborhood integer coordinate according to the reading address of each neighborhood integer coordinate in the memory; and step S740: performing interpolation calculation according to the pixel value corresponding to each neighborhood integer coordinate to obtain a pixel value of the target pixel point in an affine image corresponding to the source image.

The processes of steps S700 to S720 described above are consistent with the execution process of the address generation unit, the process of step S730 described above is consistent with the execution process of the source image reading unit, and the process of step S740 described above is consistent with the execution process of the interpolation calculation unit, which are not described herein again.

According to the image processing method designed above, the entity image processing component calculates and queries the pixel value of the target pixel point in the affine image corresponding to the source image based on the coordinate of the target pixel point so as to realize the affine transformation of the target pixel point, and in such a way, after the address generation unit receives each target pixel point in the affine area, the pixel value corresponding to each target pixel point in the affine area can be obtained, and then, an affine image corresponding to the affine area can be obtained; therefore, it can be seen that the warp calculation is completed in a pure hardware mode by the present application, so that the warp is not required to be executed by CPU software, and the resource occupancy rate of the CPU is reduced.

Figure 8:
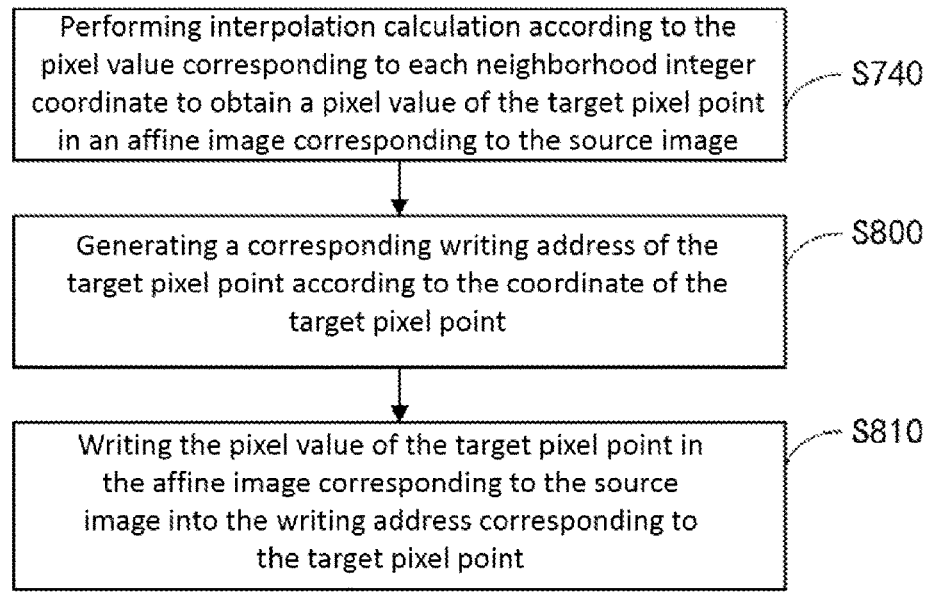
FIG. 8 is a second flowchart of an image processing method provided in an embodiment of the present application.

In an optional implementation of this embodiment, as shown in FIG. 8, after step S740, the scheme of the present application may further comprise the following steps:

step S800: generating a corresponding writing address of the target pixel point according to the coordinate of the target pixel point; and step S810: writing the pixel value of the target pixel point in the affine image corresponding to the source image into the writing address corresponding to the target pixel point.

The processes of steps S800 and S810 described above are consistent with the execution process of the writing unit, and are not described herein again. It should be noted here that the timing for generating the writing address of the target pixel point may be generated according to the coordinate of the target pixel point after the pixel value of the target pixel point in the affine image corresponding to the source image is obtained; the corresponding writing address may also be generated after the coordinate of the target pixel point is obtained by executing step S700.

Figure 9:
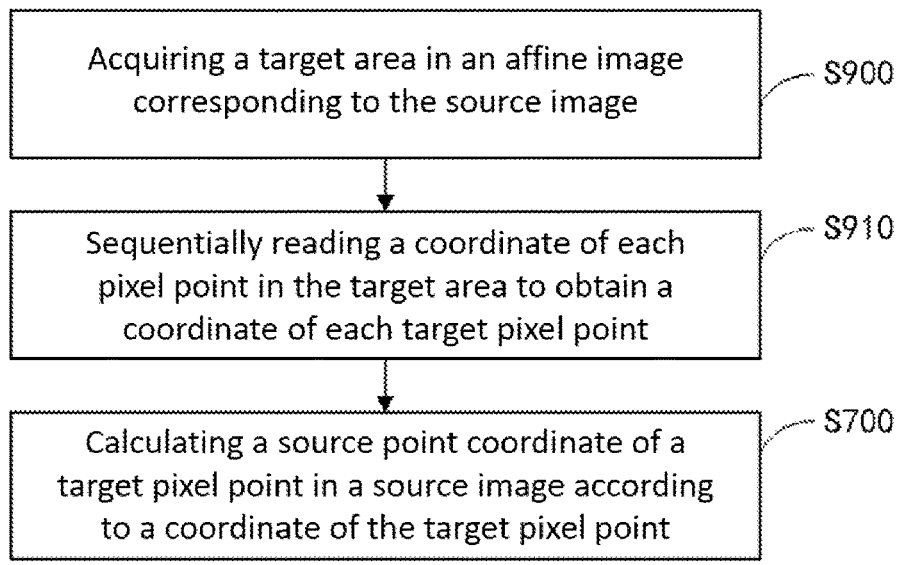
FIG. 9 is a third flowchart of an image processing method provided in an embodiment of the present application.

In an optional implementation of this embodiment, as shown in FIG. 9, before step S700, the scheme of the present application may obtain a target pixel point to be processed through the following steps, including:

step S900: acquiring a target area in an affine image corresponding to the source image; and step S910: sequentially reading a coordinate of each pixel point in the target area to obtain a coordinate of each target pixel point.

The above steps have already been described in the aforementioned description of FIG. 2 and the address generation unit, and are not described again here.

Figure 10:
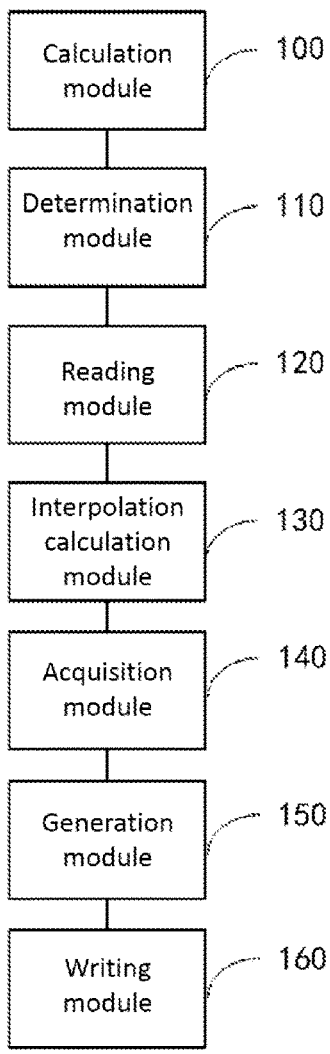
FIG. 10 is a schematic diagram of the structure of an image processing apparatus provided in an embodiment of the present application.

FIG. 10 shows a schematic block diagram of an image processing apparatus provided in the present application, it should be understood that the apparatus corresponds to the method embodiment executed in FIGS. 7 to 9, and is capable of executing the steps related to the aforementioned method, and the specific functions of the apparatus may be referred to the above description, and the detailed description is appropriately omitted here to avoid redundancy. The apparatus comprises at least one software functional module that may be stored in a memory in the form of a software or a firmware or may be cured in an operating system (OS) of the apparatus. Specifically, the apparatus comprises: a calculation module 100 that may be configured to calculate a source point coordinate of a target pixel point in a source image according to a coordinate of the target pixel point; a determination module 110 that may be configured to determine a plurality of neighborhood integer coordinates corresponding to the source point coordinate according to the source point coordinate, and determine a reading address of each neighborhood integer coordinate in a memory according to the plurality of neighborhood integer coordinates corresponding to the source point coordinate; a reading module 120 that may be configured to read and obtain a pixel value corresponding to each neighborhood integer coordinate according to the reading address of each neighborhood integer coordinate in the memory; and an interpolation calculation module 130 that may be configured to perform interpolation calculation according to the pixel value corresponding to each neighborhood integer coordinate to obtain a pixel value of the target pixel point in an affine image corresponding to the source image.

In the image processing apparatus designed above, the entity image processing component calculates and queries the pixel value of the target pixel point in the affine image corresponding to the source image based on the coordinate of the target pixel point so as to realize the affine transformation of the target pixel point, and in such a way, after the address generation unit receives each target pixel point in the affine area, the pixel value corresponding to each target pixel point in the affine area can be obtained, and then, an affine image corresponding to the affine area can be obtained; therefore, it can be seen that the warp calculation is completed in a pure hardware mode by the present application, so that the warp is not required to be executed by CPU software, and the resource occupancy rate of the CPU is reduced.

In an optional implementation of this embodiment, the apparatus further comprises an acquisition module 140 that may be configured to acquire a target area in an affine image corresponding to the source image, wherein the target area is obtained through affine transformation of a polygonal area in the source image; the reading module 120 may be further configured to sequentially read a coordinate of each pixel point in the target area to obtain a coordinate of each target pixel point.

In an optional implementation of this embodiment, the apparatus further comprises a generation module 150 that may be configured to generate a corresponding writing address of the target pixel point according to the coordinate of the target pixel point; and a writing module 160 that may be configured to write the pixel value of the target pixel point in the affine image corresponding to the source image into the writing address corresponding to the target pixel point.

Figure 11:
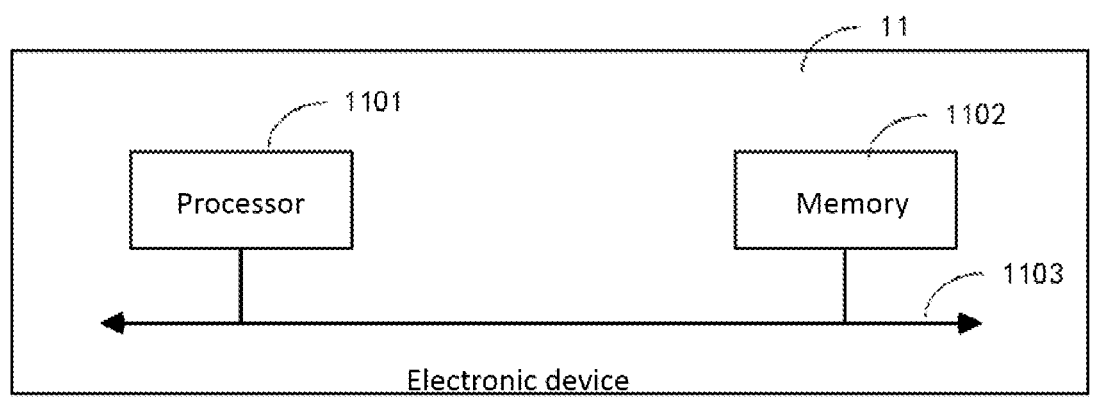
FIG. 11 is a schematic diagram of the structure of an electronic device provided in an embodiment of the present application.

As shown in FIG. 11, the present application provides an electronic device 11, which comprises: a processor 1101 and a memory 1102, wherein the processor 1101 and the memory 1102 are interconnected and communicating with each other via a communication bus 1103 and/or other forms of connection mechanisms (not shown). The memory 1102 stores a computer program executable by the processor 1101, and the processor 1101 executes the computer program when a computing device is operated, so as to perform the method according to any one of the aforementioned optional implementations. For example, steps S700 to S740: calculating a source point coordinate of a target pixel point in a source image according to a coordinate of the target pixel point; determining a plurality of neighborhood integer coordinates corresponding to the source point coordinate according to the source point coordinate; determining a reading address of each neighborhood integer coordinate in a memory according to the plurality of neighborhood integer coordinates corresponding to the source point coordinate; reading and obtaining a pixel value corresponding to each neighborhood integer coordinate according to the reading address of each neighborhood integer coordinate in the memory; and performing interpolation calculation according to the pixel value corresponding to each neighborhood integer coordinate to obtain a pixel value of the target pixel point in an affine image corresponding to the source image.

The present application provides a storage medium having a computer program stored thereon, wherein the computer program, when executed by a processor, performs the method according to any one of the aforementioned optional implementations.

The storage medium may be implemented by any type of volatile or nonvolatile storage device or a combination thereof, such as a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disk.

The present application provides a computer program product, wherein the computer program product, when operated on a computer, causes the computer to perform the method according to any one of the aforementioned optional implementations.

In the embodiments provided in the present application, it should be understood that the disclosed apparatus and method may be implemented in other manners. The apparatus embodiment described above is merely illustrative. For example, the division of the units is only a division based on logical function, and it can be implemented in other ways in an actual situation. For another example, a plurality of units or components may be combined or integrated into another system, or some features may be omitted or not implemented. In addition, the shown or discussed coupling or direct coupling or communicative connection between each other may be through some communicative interfaces, and indirect coupling or communicative connection between apparatuses or units, which may be in electrical, mechanical or other forms.

In addition, the units described as separate parts may be or may not be physically separate, and parts displayed as units may be or may not be physical units, that is, may be located in one place or may be distributed in a plurality of network units. Some or all of the units may be selected according to actual needs to achieve the purposes of the schemes of the embodiment.

In addition, functional modules in the embodiments of the present application may be integrated together to form an independent part, or each module may exist alone, or two or more modules may be integrated to form an independent part.

It should be noted that the function, if implemented in a form of a software functional module and sold or used as an independent product, can be stored in a computer-readable storage medium. Based on such understanding, the technical scheme of the present application essentially can be, or part of the technical scheme contributing to the prior art can be, or part of the technical scheme can be embodied in a form of a software product. The computer software product is stored in a storage medium and comprises several instructions for enabling a computer device (which can be a personal computer, a server, a network device, or the like) to implement all or part of the steps of the method described in the embodiments of the present application. The aforementioned storage medium comprises a U-disk, a removable hard disk, a read-only memory (ROM), a random access memory (RAM), a magnetic disk, an optical disk, or other mediums capable of storing program codes.

The relational terms such as "first" and "second" used herein are merely used to distinguish one entity or operation from another entity or operation without necessarily requiring or implying any actual relationship or order between such entities or operations.

The above described contents are only embodiments of the present application and are not intended to limit the protection scope of the present application. For those skilled in the art, the present application can be modified and varied. Any modification, equivalent, improvement and the like made without departing from the spirit and principle of the present application shall fall within the protection scope of the present application.

INDUSTRIAL APPLICABILITY

The present application provides an image processing component and a chip, an image processing method, and a storage medium, wherein the image processing component comprises an address generation unit, a source image reading unit and an interpolation calculation unit, wherein the address generation unit is connected with the source image reading unit, and the source image reading unit is connected with the interpolation calculation unit; the address generation unit calculates a source point coordinate of a target pixel point in a source image according to a coordinate of the target pixel point, determines a plurality of neighborhood integer coordinates corresponding to the source point coordinate according to the source point coordinate, and determines a reading address of each neighborhood integer coordinate in a memory according to the plurality of neighborhood integer coordinates corresponding to the source point coordinate; the source image reading unit reads and obtains a pixel value corresponding to each neighborhood integer coordinate according to the reading address of each neighborhood integer coordinate in the memory; and the interpolation calculation unit performs interpolation calculation according to the pixel value corresponding to each neighborhood integer coordinate to obtain a pixel value of the target pixel point in an affine image corresponding to the source image.

Furthermore, it should be understood that the image processing component and the chip, the image processing method, and the storage medium according to the present application are reproducible and can be used in a variety of industrial applications. For example, the image processing component and the chip, the image processing method, and the storage medium according to the present application can be used in any field where image processing is required.

What is claimed is:

1. An image processing component, comprising an address generation unit, a source image reading unit and an interpolation calculation unit, wherein the address generation unit is connected with the source image reading unit, and the source image reading unit is connected with the interpolation calculation unit;

the address generation unit is configured to calculate a source point coordinate of a target pixel point in a source image according to a coordinate of the target pixel point, determine a plurality of neighborhood integer coordinates corresponding to the source point coordinate according to the source point coordinate, determine a reading address of each neighborhood integer coordinate in a memory according to the plurality of neighborhood integer coordinates corresponding to the source point coordinate, and send the reading address of each neighborhood integer coordinate in the memory to the source image reading unit;

the source image reading unit is configured to read and obtain a pixel value corresponding to each neighborhood integer coordinate according to the reading address of each neighborhood integer coordinate in the memory, and send the pixel value corresponding to each neighborhood integer coordinate to the interpolation calculation unit; and the interpolation calculation unit is configured to perform interpolation calculation according to the pixel value corresponding to each neighborhood integer coordinate to obtain a pixel value of the target pixel point in an affine image corresponding to the source image.

2. The image processing component according to claim 1, wherein the image processing component further comprises a writing unit connected with the address generation unit and the interpolation calculation unit, respectively, wherein the address generation unit is further configured to generate a writing address of the target pixel point in the memory according to a coordinate of the target pixel point and send the writing address to the writing unit, and the writing unit is configured to write the pixel value of the target pixel point in the affine image corresponding to the source image into the writing address corresponding to the target pixel point.

3. The image processing component according to claim 1, wherein the source image reading unit comprises a plurality of reading threads, and the source image reading unit is configured to read a plurality of pixel values corresponding to the plurality of neighborhood integer coordinates using the plurality of reading threads, wherein each reading thread correspondingly reads a pixel value corresponding to one neighborhood integer coordinate.

4. The image processing component according to claim 1, wherein the image processing component further comprises a cache unit arranged between the source image reading unit and the interpolation calculation unit, wherein the cache unit is configured to store the pixel value corresponding to each neighborhood integer coordinate read by the source image reading unit.

5. The image processing component according to claim 4, wherein the address generation unit is further connected with the cache unit;

the address generation unit is further configured to determine whether at least one neighborhood integer coordinate of the plurality of neighborhood integer coordinates exists in the cache unit, if so, send a pixel value corresponding to a neighborhood integer coordinate in the cache unit to the interpolation calculation unit, and send a reading address corresponding to a neighborhood integer coordinate that does not exist in the cache unit to the source image reading unit, and otherwise, perform the step of determining a reading address of each neighborhood integer coordinate in a memory according to the plurality of neighborhood integer coordinates corresponding to the source point coordinate and sending the reading address of each neighborhood integer coordinate in the memory to the source image reading unit.

6. An image processing method comprising:

calculating a source point coordinate of a target pixel point in a source image according to a coordinate of the target pixel point;

determining a plurality of neighborhood integer coordinates corresponding to the source point coordinate according to the source point coordinate;

determining a reading address of each neighborhood integer coordinate in a memory according to the plurality of neighborhood integer coordinates corresponding to the source point coordinate;

reading and obtaining a pixel value corresponding to each neighborhood integer coordinate according to the reading address of each neighborhood integer coordinate in the memory; and performing interpolation calculation according to the pixel value corresponding to each neighborhood integer coordinate to obtain a pixel value of the target pixel point in an affine image corresponding to the source image.

7. The image processing method according to claim 6, wherein before the calculating a source point coordinate of a target pixel point in a source image according to a coordinate of the target pixel point, the method further comprises:

acquiring a target area in the affine image corresponding to the source image, wherein the target area is obtained through affine transformation of a polygonal area in the source image; and sequentially reading a coordinate of each pixel point in the target area to obtain a coordinate of each target pixel point.

8. The image processing method according to claim 6, wherein after the performing interpolation calculation according to the pixel value corresponding to each neighborhood integer coordinate to obtain a pixel value of the target pixel point in an affine image corresponding to the source image, the method further comprises:

generating a writing address corresponding to the target pixel point according to the coordinate of the target pixel point; and writing the pixel value of the target pixel point in the affine image corresponding to the source image into the writing address corresponding to the target pixel point.

9. The image processing component according to claim 2, wherein the source image reading unit comprises a plurality of reading threads, and the source image reading unit is configured to read a plurality of pixel values corresponding to the plurality of neighborhood integer coordinates using the plurality of reading threads, wherein each reading thread correspondingly reads a pixel value corresponding to one neighborhood integer coordinate.

10. The image processing component according to claim 2, wherein the image processing component further comprises a cache unit arranged between the source image reading unit and the interpolation calculation unit, wherein the cache unit is configured to store the pixel value corresponding to each neighborhood integer coordinate read by the source image reading unit.

11. The image processing component according to claim 3, wherein the image processing component further comprises a cache unit arranged between the source image reading unit and the interpolation calculation unit, wherein the cache unit is configured to store the pixel value corresponding to each neighborhood integer coordinate read by the source image reading unit.

12. The image processing method according to claim 7, wherein after the performing interpolation calculation according to the pixel value corresponding to each neighborhood integer coordinate to obtain a pixel value of the target pixel point in an affine image corresponding to the source image, the method further comprises:
  generating a writing address corresponding to the target pixel point according to the coordinate of the target pixel point; and
  writing the pixel value of the target pixel point in the affine image corresponding to the source image into the writing address corresponding to the target pixel point.

* * * * *